W. O. KENNINGTON.
IGNITION SYSTEM.
APPLICATION FILED FEB. 27, 1922.
Reissued July 11, 1922. 15,408.
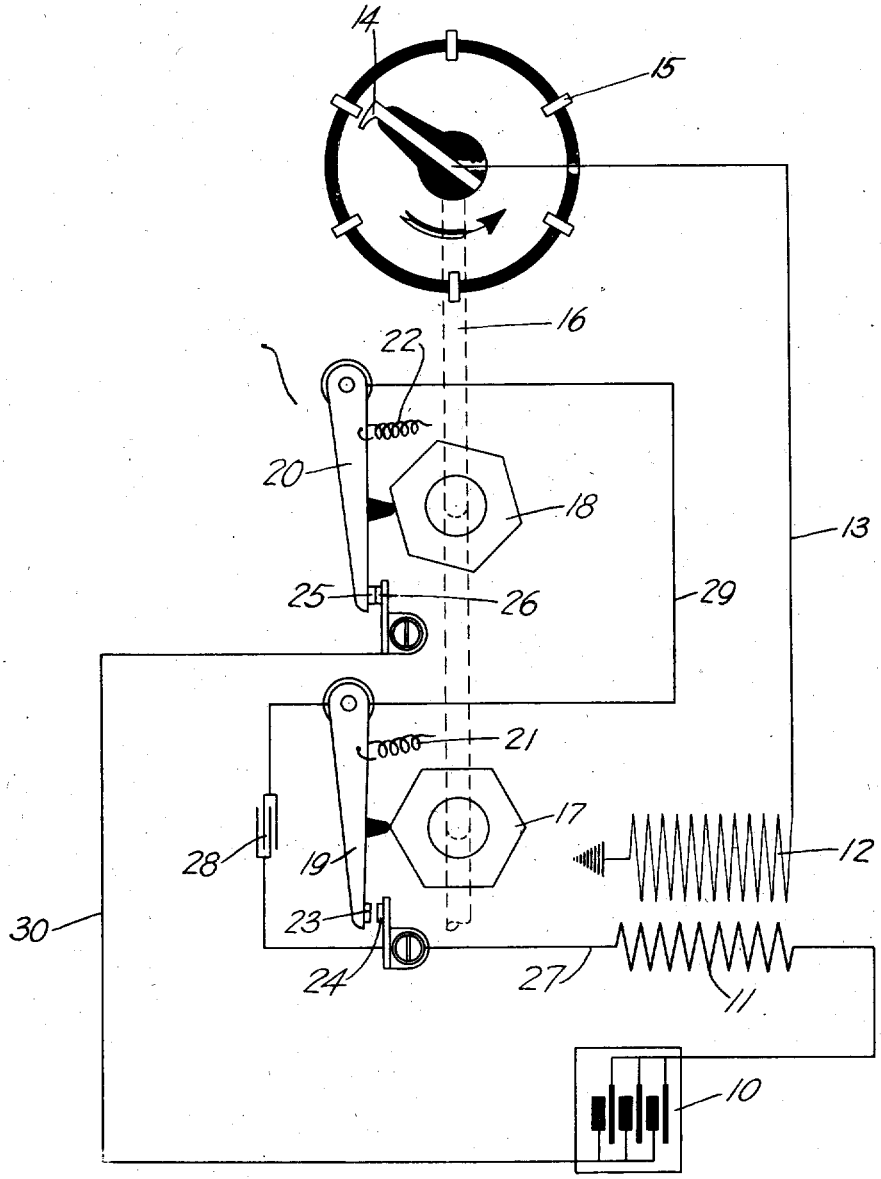
Witnesses
Walter W. Riedel
Irvin A. Greenwald
By
Inventor
William O. Kennington
Frederick J. Hardman
Attorney

UNITED STATES PATENT OFFICE.

WILLIAM O. KENNINGTON, OF LONDON, ENGLAND, ASSIGNOR TO THE REMY ELECTRIC COMPANY, A CORPORATION OF INDIANA.

IGNITION SYSTEM.

15,408. Specification of Reissued Letters Patent. Reissued July 11, 1922.

Original No. 1,347,511, dated July 27, 1920, Serial No. 255,046, filed September 21, 1918. Application for reissue filed February 27, 1922. Serial No. 539,778.

*To all whom it may concern:*

Be it known that I, WILLIAM O. KENNINGTON, a subject of the King of Great Britain, residing at 14 Panton street, London, England, have invented certain new and useful Improvements in Ignition Systems, of which the following is a full, clear, and exact description.

This invention relates to ignition systems for explosion engines and has among its objects to provide means for preventing ignition upon the reverse rotation of the engine.

This invention is particularly related to the type of ignition apparatus described and claimed in the co-pending application of John H. Hunt, Serial No. 209844, filed January 2, 1918. This application discloses ignition apparatus which produces ignition for an internal combustion engine during normal rotation of the engine, but upon reversal of rotation of the engine the sparking impulses are rendered too weak for engine ignition purposes. In the said application this result is accomplished by opening the main circuit breaker with a resistance in parallel with the breaker contacts and with a condenser, so that the energy of the coil is discharged at a rate slower than normal while the primary current is reduced to a lower value but not to zero. After a brief interval the resistance circuit is broken and the primary current falls to zero, but the energy of coil corresponding to this reduced current is too small for engine ignition.

In my invention, however, the prevention of ignition upon engine reversal is accomplished by discharging the energy of the coil at a rate too slow for engine ignition, but the reduction of primary current to zero is continuous. As a preferred means of carrying out my invention, I provide two circuit breakers in series in the primary circuit. These breakers are operated in quick succession by devices driven by the engine. The breaker which opens first to discharge the coil during normal engine rotation is constructed and cooperates with a condenser so that engine ignition is provided. There is no condenser in parallel with the contacts of the breaker which opens first during engine reversal to discharge the coil, and these contacts are constructed of a material such that a conducting arc is produced when these contacts are separated. The result is that the discharge of the coil is too sluggish to produce engine ignition.

Further objects of the invention will be apparent from the ensuing description with reference to the accompanying drawing.

The figure of said drawing is a diagrammatic view of an ignition system containing the invention referred to.

The battery 10 is a source of current for the primary coil 11, in cooperation with which is the secondary 12, connected by lead wire 13 to the rotor 14 of the distributer. This rotor distributes the high tension current to the various distributer posts 15, when rotating in the direction of the arrow, so as to distribute the sparking impulses to the various cylinders in the well known manner. The rotor 14 is shown diagrammatically as mounted to rotate upon a shaft 16, and this same shaft is connected, as also shown diagrammatically, to rotate two timer cams, namely a main timer cam 17 and an auxiliary timer cam 18.

The cam 17 operates upon a breaker arm 19 and the cam 18 operates upon a breaker arm 20. These breaker arms are held normally toward the cams by springs 21 and 22 respectively.

At the end of the breaker arm 19 is a contact 23, cooperating with the stationary contact 24. And similarly there is a contact 25 on the end of the breaker arm 20 cooperating with a stationary contact 26.

The lead wire 27 from the primary coil 11 is connected to the contact 24. And from this point a condenser 28 is shunted around the contacts 23, 24 and the breaker arm 19.

A lead wire 29 leads from the breaker arm 19 to the breaker arm 20, and a lead wire 30 connects the contact 26 with the battery 10 so that these breaker arms are then in series with the battery and the primary coil.

The general construction of these timer cams and breaker arms and their arrangement in the primary ignition circuits is well known in the art, but the feature of the present inventon comprises having two breaker arms in series in this primary circuit, with the respective cams slightly displaced as to rotary effect so that one breaker arm is operated slightly before the other in the normal rotation of the engine.

For example, it will be seen in the diagrammatic showing of Fig. 1, that the timer cam 17, rotating in the direction of the arrow, has just operated upon the breaker arm 19 to break the primary circuit at the contacts 23, 24. But at this time, the auxiliary timer cam 18, also rotating in the direction of the arrow (and being connected to rotate with the other timer cam) has not yet moved far enough to break the primary circuit at the contacts 25, 26.

However, the breaking of the main circuit through the primary coil 11 at the contacts 23, 24 through the assistance of the condenser 28 is arranged to give the requisite sparking impulse through the medium of the secondary coil 12.

The continued rotation of the two timer cams in the direction of the arrow causes the circuit to be broken at the auxiliary contacts 25, 26, and then both sets of contacts are again closed so as to remake the primary circuit in the next succeeding operation. In this operation, the opening of the circuit at the contacts 25, 26 has no effect because the circuit has already been broken through the main contacts 23, 24.

Now, however, if the engine should rotate reversely, it will be seen that in such case the auxiliary cam 18 would be the first to break the primary circuit, namely at the contacts 25, 26. And the breaking at the main contacts 23, 24 would not take place until just immediately afterward, but without any sparking effect because the circuit had already been broken at the contacts 25, 26.

It will be noted that there is no condenser shown across these auxiliary contacts 25, 26 such as is the case with the main contacts 23, 24. A further feature of the invention is that these auxiliary contacts 25, 26 are made of nickel and operate, when no condenser is present, to cause arcing to occur between them when separated to effect the discharge of the ignition coil. The character of the arc or flame produced between these nickel contacts is such as to produce a sluggish reduction to zero of the primary circuit and a relatively slow discharge of the energy of the ignition coil. The rate of discharge of the coil in this manner is such that the sparking impulse induced in the secondary is so weak that no spark will jump at the engine spark plug.

It is supposed that the arc or flame which occurs between the nickel contacts at the time of separation upon reversal of the engine, acts as a current conducting medium having such a resistance as gradually to cause a reduction of ampere-turns in the ignition coil, and thus prevent a sudden discharge of the energy of the coil.

Material other than nickel may be used to construct the auxiliary contacts provided the flame or arc produced between them possesses the properties which have been mentioned in connection with the nickel contacts.

Thus it results that these contacts may be made of cheaper metal rather than the more expensive materials such as platinum or tungsten which are customarily used for the main make and break points of the primary circuit.

I have further found it to be of some advantage in certain cases to vary the size of the contacts 25, 26 according to different metals used.

While the forms of mechanism herein shown and described constitute preferred forms of embodiments of the invention, it is to be understood that other forms might be adopted, all coming within the scope of the claims which follow.

I claim:

1. In an ignition system, a non-backfiring device comprising a primary coil with a source of current therefor, and a secondary coil with connections for producing sparking impulses; of a main make and break point, and an auxiliary make and break point, both in series in said primary circuit; means for operating said make and break points in quick succession, the main make and break being operated first in the normal rotation of the engine and last in the reverse rotation, with a condenser shunted around the contact points of the main make and break point only, substantially as and for the purpose described.

2. In an ignition system for internal combustion engines, the combination with a source of current and an induction coil, of engine controlled means for intermittently interrupting the flow of current to said coil, said means including a pair of main contacts and a condenser in shunt therewith, and including a pair of auxiliary contacts constructed of a metal which will draw a conducting arc when separated to break the ignition circuit, said main contacts opening before the auxiliary contacts during normal engine rotation, but said auxiliary contacts opening before the main contacts upon a reversal of the engine.

3. In an ignition system for internal-combustion engines, the combination with a source of current and an induction coil, of engine controlled means for intermittently interrupting the flow of current to said coil, said means including a pair of main contacts and a condenser in shunt therewith, and including a pair of auxiliary contacts constructed of nickel whereby to draw a conducting arc when separated to break the ignition circuit, said main contacts opening before the auxiliary contacts during normal engine rotation, but said auxiliary contacts opening before the main contacts upon a reversal of the engine.

4. In an ignition system for internal combustion engines, the combination with a current source and an ignition coil; of means operable upon normal engine rotation for obtaining a quick reduction of primary current for engine ignition and including devices operative during engine reversal for producing an arc in the primary circuit which prolongs the flow of current while reducing the current value at too slow a rate for sparking purposes.

5. In an ignition system for internal combustion engines, the combination with a current source and an ignition coil; of means operable upon normal engine rotation for obtaining a quick reduction of primary current for engine ignition, and including devices operative during engine reversal for providing a variable resistance in the primary circuit which prolongs the flow of current while reducing the current value at too slow a rate for sparking purposes.

6. In an ignition system for internal-combustion engines, the combination with a source of current and an induction coil, of engine controlled means for intermittently interrupting the flow of current to said coil, having provisions for obtaining a reduction of current in said coil at a rate sufficient for sparking purposes upon normal rotation of the engine, and operable on reversal of engine rotation to effect the dissipation of coil energy by means of an electric arc.

WILLIAM O. KENNINGTON.